(12) United States Patent
Zhang et al.

(10) Patent No.: US 7,274,822 B2
(45) Date of Patent: Sep. 25, 2007

(54) FACE ANNOTATION FOR PHOTO MANAGEMENT

(75) Inventors: Lei Zhang, Beijing (CN); Longbin Chen, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/609,974

(22) Filed: Jun. 30, 2003

(65) Prior Publication Data

US 2004/0264780 A1 Dec. 30, 2004

(51) Int. Cl.
*G06K 9/62* (2006.01)
(52) U.S. Cl. .................................... 382/224
(58) Field of Classification Search ............... 382/118, 382/159, 160, 181, 190, 195, 209, 218, 224, 382/229, 305; 358/403; 707/1–10
See application file for complete search history.

(56) References Cited

U.S. PATENT DOCUMENTS 6,940,545 B1 * 9/2005 Ray et al. ................ 348/222.1

OTHER PUBLICATIONS

Cohen, et al Learning Bayesian Network Classifiers for Facial Expression Recognition Using both Labeled and Unlabeled data, IEEE, pp. 1-7, Jun. 20, 2003.*
Moghaddam, et al "Bayesian Face Recognition with Deformable Image Models", IEEE, pp. 2634, 2001.*
Chen, Longbin; Hu, Baogang; Face Annotation for Family Photo Album Management; International Journal of Image and Graphics, vol. 3, No. 1 (2003); pp. 1-14.
Moghaddam, Baback; Jebara, Tony; Pentland, Alex; "Bayesian Face Recognition"; Mitsubishi Electric Research Laboratories, Inc.; Feb. 2002; 16 pages.
Rui, Yong; Huang, Thomas S.; Chang, Shih-Fu; "Image Retrieval: Current Techniques, Promising Directories and Open Issues (1999)"; Journal of Visual Communication and Image Representation; 4 pages; http://citeseer.nj.nec.com/rui99image.html.
Satoh, Shin'ichi; Sato, Toshio; et al.; Name-It: Naming and Detecting Faces in News Video (1999); IEEE Multimedia; 2 pages; http://citeseer.nj.nec.com/satoh99name.html.
Sun, Yanfeng; Zhang, Hongjiang; Zhang, Lei; Li, Minjing; "MyPhotos—A System for Home Photo Management and Processing"; Microsoft Research Asia, Beijing, China; 2 pages.
Viola, Paul; Jones, Michael J.; "Robust Real-Time Object Detection"; Cambridge Research Laboratory, Technical Report Series; Feb. 2002; 29 pages.

(Continued)

*Primary Examiner*—Daniel Mariam
(74) *Attorney, Agent, or Firm*—Lee & Hayes, PLLC

(57) ABSTRACT

Systems and methods for annotating a face in a digital image are described. In one aspect, a probability model is trained by mapping one or more sets of sample facial features to corresponding names of individuals. A face from an input data set of at least one the digital image is then detected. Facial features are then automatically extracted from the detected face. A similarity measure is them modeled as a posterior probability that the facial features match a particular set of features identified in the probability model. The similarity measure is statistically learned. A name is then inferred as a function of the similarity measure. The face is then annotated with the name.

36 Claims, 6 Drawing Sheets

OTHER PUBLICATIONS

Yan, Shuicheng; Liu, Ce; Li, Stan Z.; Zhang, Hongjiang; Shum, Heung-Yeung; Cheng, Qiansheng; "Texture-Contrained Active Shape Models"; Microsoft research Asia, Beijing, China; pp. 107-113.

Yu, Hui; Li, Mingjing; Zhang, Hong-Jiang; Feng, Jufu; "Color Texture Moments for Content-Based Image Retrieval"; Beijing, China; 4 pages.

Zhao, W.; Chellappa, R.; Rosenfeld, A.; Phillips, P.J.; "Face Recognition: A Literature Survey (2000)"; http://citeseer.nj.nec.com/zhao00face.html.

Zhou, Xiang Sean; Huang, Thomas S.; "Relevance Feedback in Image Retrieval: A Comprehensive Review"; ACM Mulitmedia Systems Journal; 25 pages.

Li, Stan Z.; Zhu, Long; Zhang, Zhenqiu; Blake, Andrew; Zhang, Hong-Jiang; Shum, Harry; "Statistical Learning of Multi-View Face Detection"; Microsoft Research, Asia; 15 pages.

* cited by examiner

FACE ANNOTATION FOR PHOTO MANAGEMENT

TECHNICAL FIELD

The invention pertains to image processing.

BACKGROUND

With the rapid development of digital cameras and scanners, digital photographs are becoming a commodity, especially since the cost of taking a digital photograph is virtually free of charge. As a result, digital photographs can accumulate rapidly and automated tools for organizing digital photographs have become extremely desirable. Unfortunately, and even in view of the extensive research in face detection and recognition in computer vision that has been performed to date, there are still no commercial products available for effectively organizing digital photographs of individuals in everyday situations (e.g., photos in a family photo album) by annotating semantics of photographic content.

In part, this is because of the great difficulty of generating an acceptable algorithm for contending with the complexity of human perception for face recognition. It is still not clear how people recognize faces and how they remember previously viewed faces. Such complexities of facial recognition are further exacerbated when photographs are subject to non-homogenous lighting conditions, do not include frontally aligned faces, and/or contain large variation in facial expression across multiple photos. However, most family album photo scenarios are taken under such non-ideal, or non-studio controlled conditions. It very difficult to establish a reliable face model of an individual unless it is frontally aligned, subject to substantially homogenous lighting conditions, and contains small variation in facial expression from one photo of the individual to another. Moreover, generally it is not practical to ask a user to collect a large number of well aligned sample faces to train an accurate model of an individual. Each of these factors contributes to the inaccuracy of conventional facial recognition algorithms.

For these reasons, no effective face recognition solution for automated annotation of family photographs that include faces is available at this time. As a result, semantic annotation of faces in digital photos is still left to the user. As can be appreciated, such a task can be substantially tedious (i.e., labor intensive and time consuming), especially considering that large accumulations of digital photographs, such as those in a family album, are commonplace.

SUMMARY

Systems and methods for annotating a face in a digital image are described. In one aspect, a probability model is trained by mapping one or more sets of sample facial features to corresponding names of individuals. A face from an input data set of at least one the digital image is then detected. Facial features are then automatically extracted from the detected face. A similarity measure is them modeled as a posterior probability that the facial features match a particular set of features identified in the probability model. The similarity measure is statistically learned. A name is then inferred as a function of the similarity measure. The face is then annotated with the name.

BRIEF DESCRIPTION OF THE DRAWINGS

In the figures, the left-most digit of a component reference number identifies the particular figure in which the component first appears.

DETAILED DESCRIPTION

Overview

Figure 1:
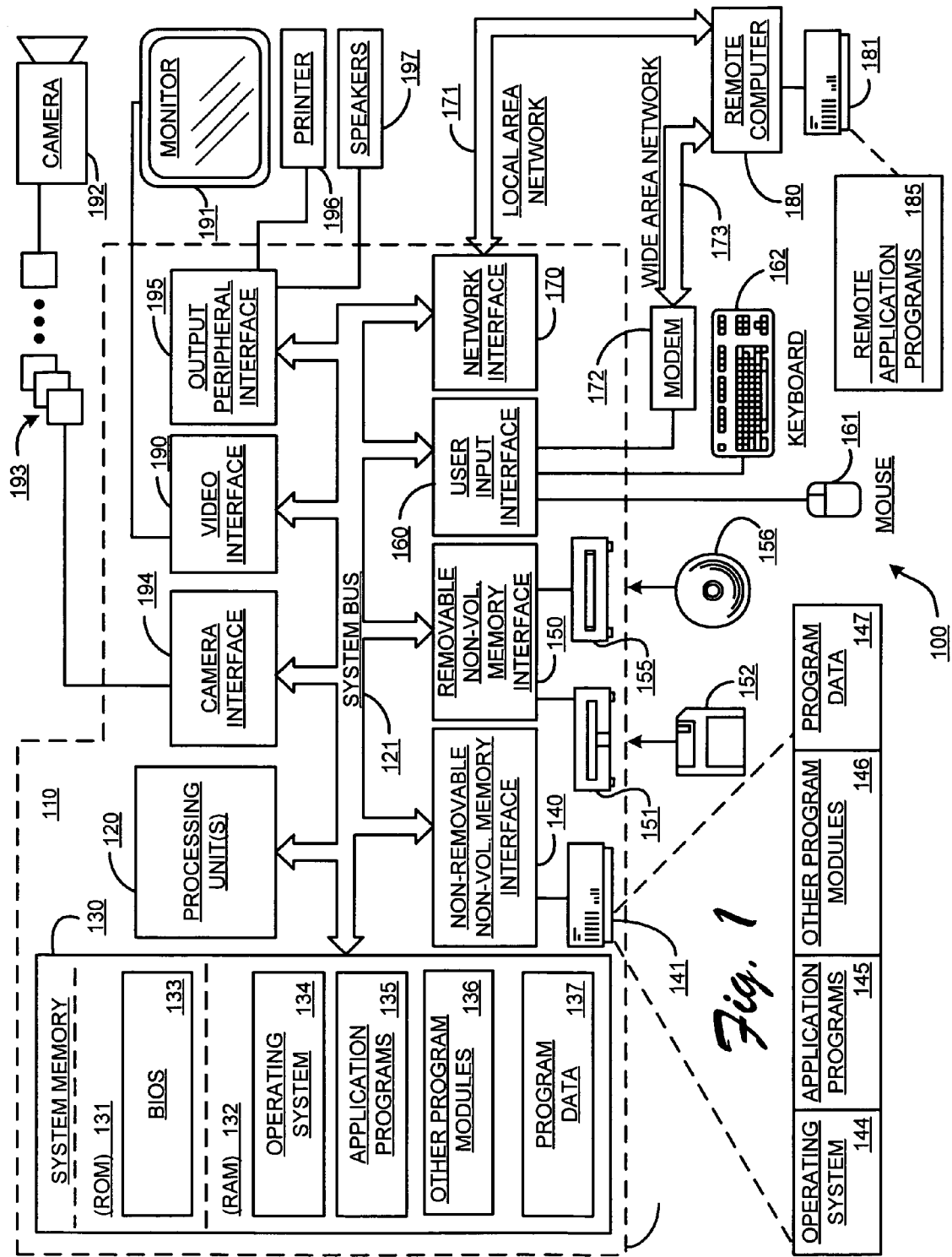
FIG. 1 is a block diagram of an exemplary computing environment within which systems and methods to annotate faces in digital images for photo management may be implemented.

Most known face recognition algorithms can be categorized into two classes, geometric feature-based and template-based. Geometric feature-based methods analyze explicit local facial features and their geometric relationships. Representative works include active shape model, an elastic Bunch graph matching algorithm, and Local Feature Analysis (LFA). Template-based methods compute correlation between a face and one or more model templates to estimate face identity. The current state-of-the-art of such methods is characterized by a family of subspace methods originated by "eigenfaces"; a common performance benchmark among face recognition research efforts. This benchmark was further extended to view-based and modular eigenspaces. Other conventional systems estimate density in high-dimensional spaces using eigenspace decomposition and then derive a probabilistic measure of similarity based primarily on a Bayesian analysis of image differences.

Although such conventional face recognition techniques generally demonstrate acceptable recognition results under substantially ideal photographic conditions, they do not always produce acceptable results in less than ideal conditions, wherein digital images include variations in facial positions, illumination, and expression. Instead, such less than ideal conditions are typically problematic for these conventional face recognition techniques, causing less than desired accuracy and robustness. Although the recognition accuracy can be improved by view-based methods or 3D face recognition approaches, it is generally not feasible ask a user to collect a large number of well aligned sample faces to train an accurate model of an individual, especially in a family album scenario.

Content-based image retrieval (CBIR) has been another active research area. Most of the research in this area has been focused on use of low-level visual features, such as color, texture and shape, to define similarities between images. However, it is extremely difficult to find a mapping between the high-level semantics and low-level features in images. Attempting to bridge this gap, interactive learning mechanisms such as relevance feedback have been combined with CBIR techniques. Yet, this combination has been substantially limited in its effectiveness for numerous reasons. One reason for CBIRs failure to lend itself to mapping of low level features to high level semantics is because CBIR techniques, at their core, are directed to general image retrieval, and not to mapping of high level semantics of objects in digital images. As a result, CBIR based techniques do not lend themselves very well to automatic family photo organization and management. To make matters worse, combining relevance feedback with CBIR requires considerable and typically undesirable user interaction with a CBIR tool to obtain even partially acceptable mappings.

The following systems and methods of the invention address the need for an effective face recognition solution for automated annotation of photographs that include faces. In particular, the systems and methods present a framework that reformulates face annotation from a pure face recognition problem, to a problem of similar face search and annotation propagation to seamlessly integrate content-based image retrieval (CBIR) and face recognition algorithms in a Bayesian framework that utilizes a statistically learned similarity measure. For purposes of discussion, the systems and methods are described with respect to photographic collections wherein particular individuals may appear frequently (e.g., in a number of photographs) in a particular context (e.g., photos taken on a same day and/or at a particular event) and in color. An individual's frequency and context of appearance in a set of photographs is used by the framework to improve face recognition and face annotation accuracy. Photo collections with such characteristics are often, for example, found in family photo albums.

As described in greater detail below in reference to FIGS. 1-10, the systems and methods of the invention define face similarity as a maximum a-posteriori (MAP) estimation that is calculated using both contextual (e.g., body, background, day, time, and so on), and face appearance and components (eyes, nose and mouth) features. Support vector machine (SVM) classifiers are adapted to model the a posteriori probability of contextual features. For face appearance and facial components features, probabilities are modeled in eigenspaces. In one implementation, the proposed framework integrates facial components as additional features. Additionally, and to deal with any missing facial features (e.g., due to non-frontal alignment of a face, non-homogenous lighting conditions, variations in facial expression, and so on, each of which are common in family album scenarios), marginal probability is used to compare samples with missing features to a full feature set to ensure a non-biased annotation decision.

Relevance feedback is used to improve the similarity search result, or to label multiple faces in a batch way. For instance, after a face has been detected, the framework allows a user either to provide a name label for the detected face, or confirm or select a name from a recommended name list derived from a prior face annotation history.

In everyday photo-taking activities, photographers are typically free to take photos independent of any environmental/lighting/subject position/etc. constraints. As a result, facial poses, lighting and expression may significantly vary across a set of pictures. To address the potential for such a diversity of image characteristics and still provide for robust and accurate face annotation, a performance measure for dynamic utilization of different combinations of approaches to face feature annotation and learning is utilized. The performance measure allows any algorithm, which is expected to perform well in only a subset of all possible photographic conditions, to identify when one or more missing photographic constraints (e.g., features, lighting, etc.) will cause the algorithm to perform less than optimally. This allows multiple different image processing algorithms are selectively combined into the framework as a function of detected and non-detected features to achieve high annotation accuracy.

Exemplary systems and methods to annotate faces for photo management are now described in greater detail.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described framework (i.e., systems, apparatuses and methods) to annotate faces in digital images for photo management may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

With reference to FIG. 1, an exemplary system to annotate faces for photo management includes a general purpose computing device in the form of a computer 110. Components of computer 110 may include, but are not limited to, one or more processing units 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they are at least different copies.

A user may enter commands and information into the computer 110 through input devices such as a keyboard 162 and pointing device 161, commonly referred to as a mouse, trackball or touch pad. Such commands and information include, for example, the identity/location of digital image data such as a family photo album for face annotation, a command to search a data set for an image that includes a particular face or annotated name, user face annotation relevance feedback, and so on. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. The monitor can be used to display digital images with face annotations identified or to be identified via the systems and methods of the invention. In addition to the monitor, computers may also include other peripheral output devices such as speakers 197 and printer 196, which may be connected through an output peripheral interface 195.

A camera 192 (such as a digital/electronic still or video camera, or film/photographic scanner) capable of capturing a sequence of images (e.g., photo album images) 193 may also be included as an input device to the computing device 110. Further, while just one camera is depicted, multiple similar or different digital image input devices can be coupled to the computing device 110. The images 193 from the one or more cameras 192 are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from peripheral devices different than a camera 192, for example via any of the aforementioned computer-readable media.

The computer 110 may operate in a networked environment using logical connections to one or more remote computers, such as a remote computer 180. The remote computer 180 may be a personal computer, a server, a router, a handheld device such as a handheld PC, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks of various implementation such as one or more wireless communication networks. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary and other means of establishing a communications link between the computers may be used.

Exemplary Application Programs and Data

Figure 2:
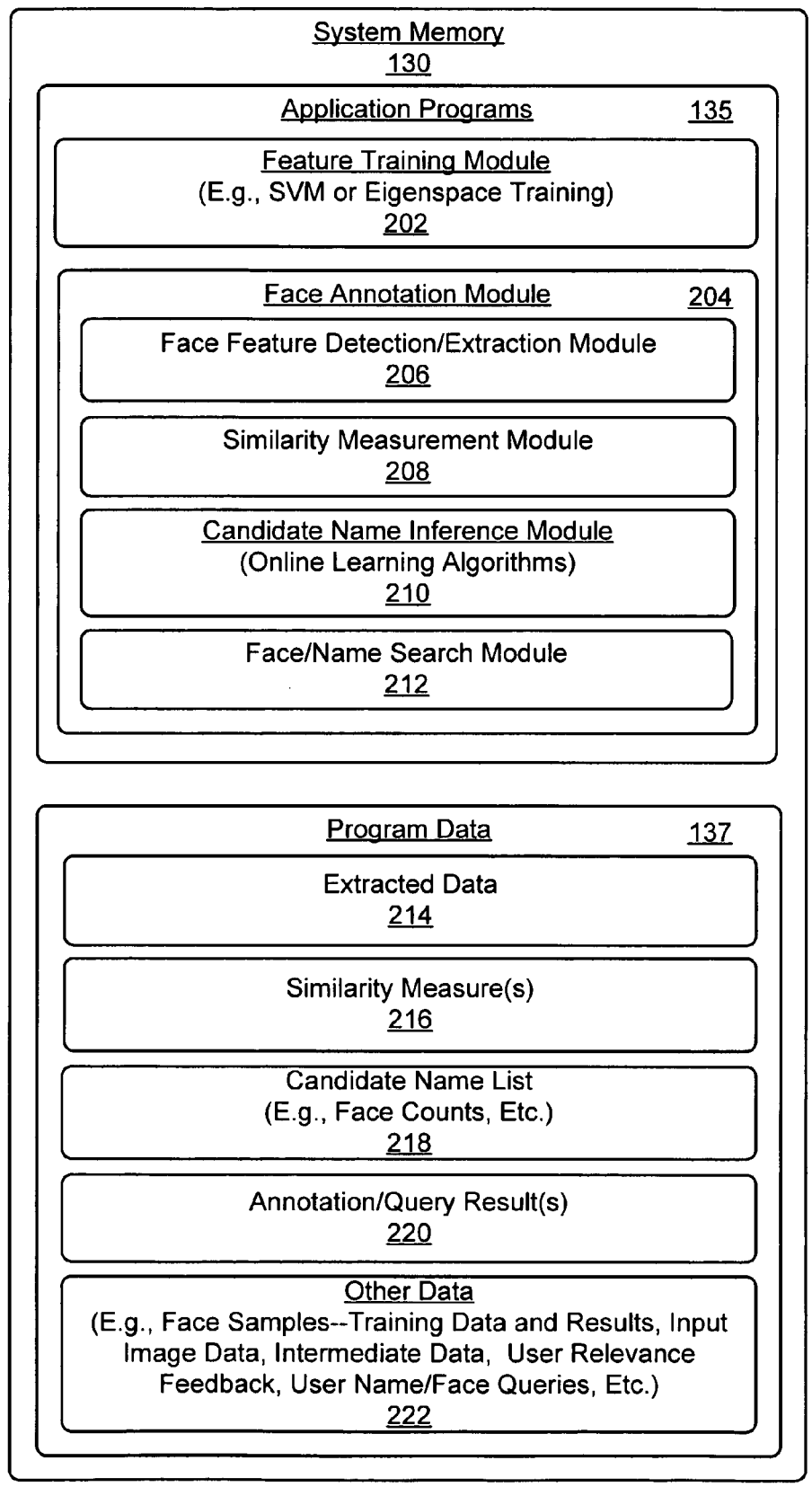
FIG. 2 is a block diagram that shows further exemplary aspects of system memory of FIG. 1, including application programs and program data for face annotation.

FIG. 2 is a block diagram that shows further exemplary aspects of system memory 130 of FIG. 1, including application programs 135 and program data 137 to annotate faces for digital image management. In this implementation, application programs 135 include, for example feature training module 202 and face annotation module 204. The feature training module 202 uses one or more Support Vector Machine (SVM) or eigenspaces approaches to train a probability model (e.g., likelihood model, conditional probability model, and/or the like) for each feature to be used in annotating faces. For purposes of discussion, face samples, which are also referred to as "training data" are shown as a portion of "other data" 222. The training data represent a corpus of digital images that the feature training module 202 uses to train the probability models. Trained features include, for example, body position, face appearance, face components such as eyes, and mouth, etc.).

Face annotation module 204 annotates faces in digital image data based on training results of the feature training module 202. (The digital image data (input digital photographs) and the training results are represented as portions of "other data" 222). To this end, the face annotation module 204 includes, for example, face feature detection/extraction module 206, similarity measurement module 208, candidate name inference module 210, and face/name search module 212. It can be appreciated that although the face annotation module of this implementation is described with respect to a certain number of modules (i.e., modules 204-212, the face annotation module 204 of a different implementation may include any number of component modules to annotate faces. We now described exemplary operations of these component modules.

Figure 3:
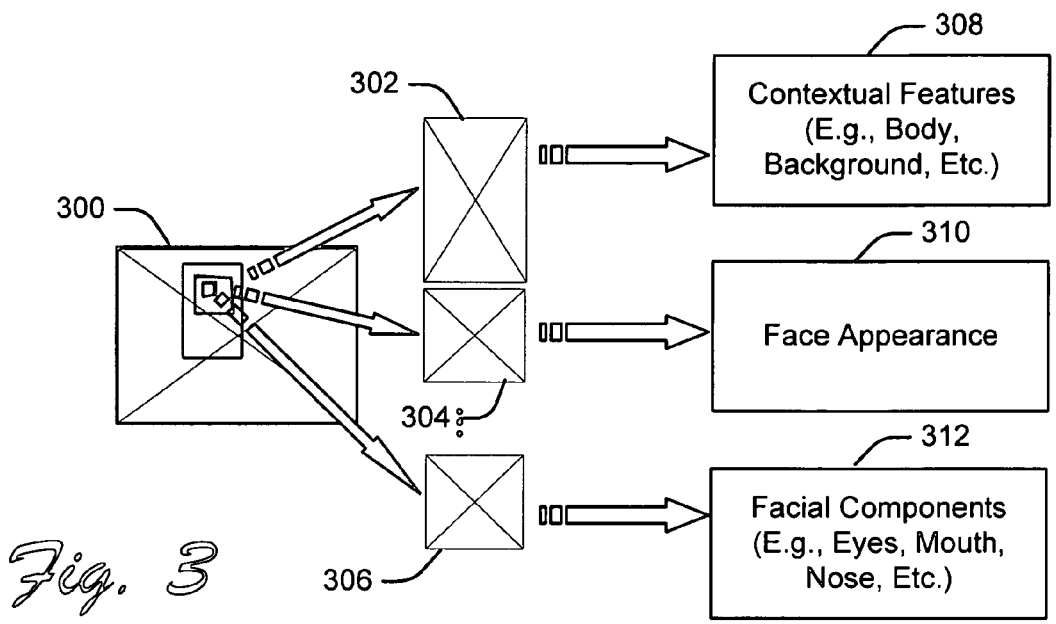
FIG. 3 shows exemplary areas, including an expanded area, from which facial appearance, component, and features used for annotating faces are extracted from a digital image/photo.

Face feature detection/extraction module 206 detects and extracts facial appearance, component, and context features from extended face areas identified in the digital image data. These extracted data are represented as extracted data 214. Note that extracted data includes contextual information, information that is not typically utilized in conventional face recognition algorithms. FIG. 3 shows exemplary contextual, appearance, and component features that have been extracted from a digital photo 300. These types of facial features are used by the face annotation module 204 in combination with other information, as described below, to annotate faces.

Appearance Features

The face feature detection/extraction module 206 of FIG. 2 uses a pose-invariant face detector [1] to detect faces from the image data. Face appearance features are extracted based on the face detection results (e.g., see "other data" 222). Because face appearance features are most reliable when extracted from frontal faces, module 206 accurately determines whether or not a detected face is frontal posed or non-frontally aligned (skewed). In particular, module 206 applies a Texture-Constrained Active Shape Model (TC-ASM) [2] trained from frontal faces, and localizes facial points in each detected face. Then, module 206 calculates the texture reconstruction error of that face. As a strong prior model corresponding to frontal faces is built in the TC-ASM, the reconstructed face textures are very close to frontal faces and thus the texture reconstruction error is a good measure for frontal faces. Therefore, if the texture reconstruction error (e.g., intermediate data portions of "other data" 222) of a face is lower than a certain threshold, the system identifies that face to be a frontal face; otherwise, the face appearance feature is treated as a missing feature. After this process, each face is geometrically aligned into a standard normalized form to remove any variations in translation, scale, in-plane rotation and slight out-of-plane rotation. Then the normalized gray face images are stored as face appearance feature(s)—a portion of the extracted data 214.

Component Features

The face feature detection/extraction module 206 utilizes facial component features to improve face recognition accuracy. This is because facial components such as eyes are not as sensitive to face orientation as face appearance. For example, if we denote frontal face orientation by 0°, eye appearances in ±30° out-of-plane rotated faces are still similar to those in frontal faces.

Figure 4:
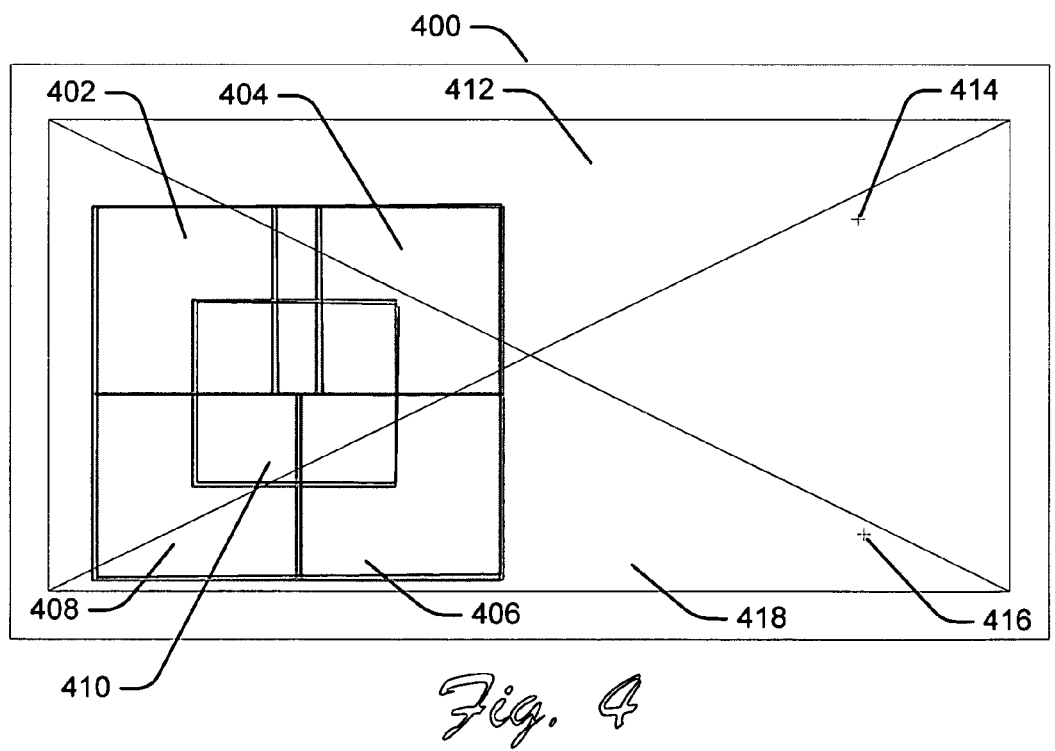
FIG. 4 shows an exemplary set of areas that encapsulate facial feature components. The areas are utilized to detect and extract facial features when annotating faces in a digital image.

FIG. 4 shows an exemplary set of facial feature components for annotating faces in digital images. The facial component features in FIG. 4 are each contained within one or more rectangles. In this example, each face rectangle is slightly extended and partitioned into five overlapped areas 402 through 410, corresponding to two eyes, a nose, and two mouth corners, respectively. Then a set of object detectors, derived from a robust algorithm (e.g., such as that described in [5]) are utilized to detect each facial component in the corresponding area. The facial features and contextual information are extracted from each detected face area.

In this implementation, the center point of a facial component is the average center of all the detected rectangles in different scales for that component. If the number of detected rectangles for a facial component is less than a certain threshold, the feature of that facial component is treated as a missing feature.

Contextual Features

Face feature detection/extraction module 206 extracts facial contextual features from extended face regions (e.g., see extended region 302 of FIG. 3, wherein the extended area includes not only a facial area, but also the torso of the subject). In family photo album scenarios, it is very common that an individual may appear in multiple photographs taken in the same day or event often wearing the same clothes. In this implementation, such contextual features are extracted from the photograph(s) and are used to distinguish a one individual from another individual in the album. Several such contextual features have been compared in [3] and what we have adopted for face annotation are the banded auto-correlogram, which is very effective by combining the color and texture features together, and an additional color texture moment feature [4]. By dividing the extended face region into some number of blocks, local regional features are extracted to capture the structural information of body patches. In this implementation, the extended face region is divided into 2×1 blocks, although other block numbers can be used.

In this implementation, contextual similarity between two pictures is not compared when the photos were taken on different days that are substantially far apart from one-other. For example, only photos taken within a configurable number of days (e.g., two (2) days) are compared for contextual similarity, otherwise the contextual features are treated as missing features. The date and time data can be automatically obtained either from information stored in image files, or from date/time stamps printed on the pictures. In case that both information are not available, the system will use the file date as the taken date and also allow the user to modify the taken date manually.

Similarity Measure

Once a set of features is extracted and their applicable situations are identified, the remaining issue is how to measure the similarity between two detected faces using these features. A more challenging issue is how to annotate an unknown face by learning from historical labeling results based on these features. These types of measurements are performed by the similarity measurement module 208, wherein face similarity, or similarity measurement 216 is calculated as a maximum a posteriori (MAP) estimation.

In particular, let $F=\{f_i | i=1, \ldots, N_f\}$ denote the features set, where each feature $f_i$ is a vector corresponding to a specific feature described in the previous section. Let $\{p_i | i=1, \ldots, C\}$ denote individuals appearing in respective digital images in a set of digital images. Given an unknown individual with feature F, the similarity measurement module 208 classifies the individual by maximizing a posterior in accordance with the Bayesian rule:

$$p^* = \underset{p_i}{\operatorname{argmax}} p\Big(p_i | F\Big) = \underset{p_i}{\operatorname{argmax}} p(F | p_i) p(p_i) / p(F) \quad (1)$$

As the features are extracted from different areas, or of different types, such as color correlogram or appearance gray texture patches, we consider them to be independent with respect to one another. Thus, (1) can be rewritten as:

$$p^* = \underset{p_i}{\operatorname{argmax}} \left[ \prod_{j=1}^{N_f} p(f_j | p_i) \right] p(p_i) / p(F), \quad (2)$$

where p(F) can be ignored as it does not affect the classification result if we consider it does not vary across all images, and $p(p_i)$ can be estimated from the historical labeling results. However, estimating the likelihood $p(f_j|p_i)$ has two difficulties. First, each $f_j$ is usually a high dimensional vector. Second, training data for the probability estimation are substantially limited for each individual $p_i$. In general, insufficient samples in high dimensional spaces will result in inaccurate probability estimation and thus yield low performance in face annotation.

To overcome such limitations, we cast the standard face recognition from a many-class classification problem (i.e., greater than two class classifications) to a two class classification by introducing two classes of face feature variations, intra-personal feature variations $\Omega_I$ and inter-personal feature variations $\Omega_E$. $\Omega_I$ corresponds to facial feature differences between appearances of a same individual, and wherein $\Omega_E$ corresponds to facial feature variations between different individuals. (Conventional techniques for probabilistic learning for object representation do not address complex situations wherein multiple features need to be combined, and wherein some of the features may be missing).

By introducing two mutually exclusive classes $\Omega_I$ and $\Omega_E$, the similarity between two faces is defined as:

$$S(F_1, F_2) = p(\Delta F \in \Omega_I) = p(\Omega_I | \Delta F) \quad (3),$$

where $\Delta F = (F_1 - F_2)$ is the difference between two face features. Actually, the posterior probability can be treated as a non-Euclidean similarity measure. Using the Bayesian rule, (3) can be rewritten as:

$$S(F_1, F_2) = \frac{p(\Delta F | \Omega_I) p(\Omega_I)}{p(\Delta F | \Omega_I) p(\Omega_I) + p(\Delta F | \Omega_E) p(\Omega_E)}, \quad (4)$$

where $p(\Omega_I)$ and $p(\Omega_E)$ are the a priors, which can be estimated empirically or from the number of training images belonging to the two classes. $p(\Delta F | \Omega_I)$ and $p(\Delta F | \Omega_E)$ are the likelihoods for a given difference $\Delta F$, and can be estimated from a large set of training data which do not depend on any particular individual. On the contrary, the likelihood $p(F|p_i)$ in (1) explicitly depends on the specified individual $p_i$ and thus usually encounters the problem of insufficient training data.

It is worth noting that two terms in the denominator of (4) should not be ignored as in most Bayesian MAP classification problems, because the problem being solving is not to classify a given face difference to either $\Omega_I$ or $\Omega_E$, but to output a similarity measure for any two given faces.

Again, assume the independency of different features and denote the feature difference by $\Delta f_j = (f_{j1} - f_{j2})$ for each feature between two faces, (4) can be further expressed as:

$$S(F_1, F_2) = \frac{\prod_{j=1}^{N_f} p(\Delta f_j | \Omega_I) p(\Omega_I)}{\prod_{j=1}^{N_f} p(\Delta f_j | \Omega_I) p(\Omega_I) + \prod_{j=1}^{N_f} p(\Delta f_j | \Omega_E) p(\Omega_E)}. \quad (5)$$

This similarity function (5) seamlessly integrates multiple features into a Bayesian framework. Based on this similarity measure, the candidate name inference module 210 can generate name candidates for a given unknown face. In this implementation, and as described below in the section titled "Candidate Name List Generation", such candidate names are stored in a candidate name list 218 and are derived by statistical learning approaches, such as K nearest neighborhood algorithm.

Missing Features

If all features for any two given faces are available, their similarity can be directly calculated according to equation (5). However, as mentioned above, each feature has its particular applicable range, and it is very common that some of the features are not available in some images such as in the family album scenario. In such cases, the similarity measurement module 208 addresses the feature ranking problem, in which a set of samples are ranked in accordance with their similarities to a given query sample, no matter whether there are any missing features for each sample.

Figure 5:
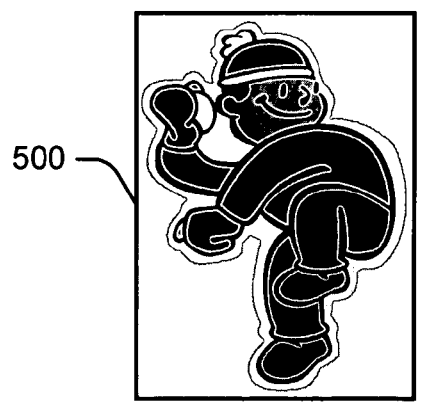
FIG. 5 shows an exemplary digital image of a person that has not been identified. The combination of FIG. 5 with FIGS. 6 and 7 are used to illustrate that a posterior probability of a similarity measure for a particular set of features can be integrated or "marginalized over one or more missing features of other images to arrive at a similarity measure for the missing feature(s).
Figure 6:
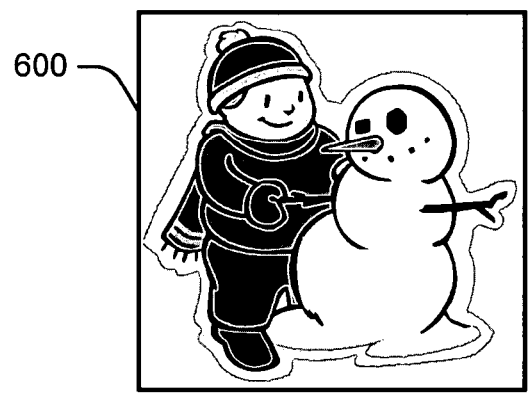
FIG. 6 shows an exemplary digital image of a person, wherein there are no "missing features". That is the individual's facial profile is substantially frontally aligned such that facial appearance, components are identifiable, and contextual information corresponding to the clothing worn by the individual and the identity of the individual have been identified (e.g., person "A").
Figure 7:
FIG. 7 shows an exemplary digital image of a person with "missing features". In particular, the facial appearance and components cannot be unidentified, but other contextual features such as the color of the persons clothing, etc. can be identified.
Figure 8:
FIG. 8 shows an exemplary user interface for face annotation propagation and user relevance feedback.

To illustrate exemplary missing features, FIGS. 5, 6, and 7 each show a respective image of a person and exemplary facial appearance, components, and/or contextual information with respect to that person. FIG. 5 shows a person, wherein the operations of the face feature detection/extraction module 206 of FIG. 2 has detected that the individual's facial profile is substantially frontally aligned and the clothing worn by the individual is yellow. The identity of the individual is unknown and is what the system wants to infer. FIG. 6 shows an image wherein there are no "missing features. That is the individual's facial profile is substantially frontally aligned such that facial appearance and facial components were identifiable, and contextual information corresponding to the clothing worn by the individual. From these features, the identity of the individual has been inferred (e.g., person "A"). In contrast, FIG. 7 shows an image wherein the facial appearance and components cannot be identified (i.e., they are missing features), but contextual information such as the color of the persons clothing, etc. can be identified.

The combination of FIGS. 5-7 are used to illustrate that a posterior probability of a similarity measure for a particular set of features can be integrated ("marginalized") over one or more missing features of other images to arrive at a similarity measure for the missing feature(s). More specifically, to simplify a derivation of the missing features and without losing generality, suppose that there are only two features in (5), facial appearance feature and body color feature (e.g., as indicated in FIG. 7). The corresponding feature differences are denoted as f and b. Note that the symbol Δ is ignored for simplicity. If f is unknown or missing, the Bayesian rule is applied again to derive how to measure the similarity given the known feature b. We then rewrite (5) as follows:

$$S(F_1, F_2) = \frac{p(f|\Omega_I)p(b|\Omega_I)p(\Omega_I)}{p(f|\Omega_I)p(b|\Omega_I)p(\Omega_I) + p(f|\Omega_E)p(b|\Omega_E)p(\Omega_E)}$$

$$= \frac{\frac{p(f|\Omega_I)}{p(f)}\frac{p(\Omega_I)}{p(\Omega_I)}p(b|\Omega_I)p(\Omega_I)}{\frac{p(f|\Omega_I)}{p(f)}\frac{p(\Omega_I)}{p(\Omega_I)}p(b|\Omega_I)p(\Omega_I) + \frac{p(f|\Omega_E)}{p(f)}\frac{p(\Omega_E)}{p(\Omega_E)}p(b|\Omega_E)p(\Omega_E)}$$

$$= \frac{p(\Omega_I|f)\frac{1}{p(\Omega_I)}p(b|\Omega_I)p(\Omega_I)}{p(\Omega_I|f)\frac{1}{p(\Omega_I)}p(b|\Omega_I)p(\Omega_I) + p(\Omega_E|f)\frac{1}{p(\Omega_E)}p(b|\Omega_E)p(\Omega_E)}$$

where p(f) is the evidence probability and can be expressed as:

$$p(f) = p(f|\Omega_I)p(\Omega_I) + p(f|\Omega_E)p(\Omega_E).$$

Given that f is unknown, the posterior probability $p(\Omega_I|f)$ can be replaced with the prior probability $p(\Omega_I)$, and $p(\Omega_E|f)$ can be replaced with $p(\Omega_E)$, as the only information we are allowed to use for $p(\Omega_I|f)$ and $p(\Omega_E|f)$ is the value of the prior probabilities. Therefore the similarity function can be further simplified as if there is no feature f:

$$S(F_1, F_2) = \frac{p(b|\Omega_I)p(\Omega_I)}{p(b|\Omega_I)p(\Omega_I) + p(b|\Omega_E)p(\Omega_E)}. \quad (7)$$

This derived function is equivalent to a determination that the posterior probability of similarity measure is integrated (marginalized) over the missing feature. This is because:

$$p(f,b) = p(f|\Omega_I)p(b|\Omega_I)p(\Omega_I) + p(f|\Omega_E)p(b|\Omega_E)p(\Omega_E).$$

The marginal probability of (6) over the feature f is:

$$\int S(F_1, F_2) df = \int \frac{p(f|\Omega_I)p(b|\Omega_I)p(\Omega_I)}{p(f,b)} df \quad (8)$$

$$= \int \frac{p(f|\Omega_I)p(b|\Omega_I)p(\Omega_I)}{p(f)p(b)} df$$

$$= \int \frac{p(f|\Omega_I)}{p(f)} \frac{p(b|\Omega_I)p(\Omega_I)}{p(b)} df$$

$$= \frac{p(b|\Omega_I)p(\Omega_I)}{p(b)} \int \frac{p(f|\Omega_I)p(\Omega_I)}{p(f)} \frac{1}{p(\Omega_I)} df$$

$$= \frac{p(b|\Omega_I)p(\Omega_I)}{p(b)} \frac{1}{p(\Omega_I)} \int p(\Omega_I|f) df$$

$$= \frac{p(b|\Omega_I)p(\Omega_I)}{p(b)}.$$

Equations (7) and (8) are equivalent by replacing p(b) with $p(b|\Omega_I)p(\Omega_I) + p(b|\Omega_E)p(\Omega_E)$; equation (5) is dealt with in the same way.

Likelihood Estimation

For each feature in (5), the conditional probabilities $p(\Delta f_j|\Omega_I)$ and $p(\Delta f_j|\Omega_E)$ are estimated offline from a large set of training data by conventional eigenspace or SVM approaches. For Gaussian distributed features, the probabilities are estimated by eigenspace decomposition. The densities are zero-mean since for each $\Delta f_j = f_{j1} - f_{j2}$ there exists a $\Delta f_j = f_{j2} - f_{j1}$. Therefore, the likelihood estimation of an N dimensional input feature $\Delta f$ is given by:

(6)

$$p(\Delta f|\Omega) = \left[\frac{\exp\left(-\frac{1}{2}\sum_{i=1}^{M} y_i^2/\lambda_i\right)}{(2\pi)^{M/2}\prod_{i=1}^{M}\lambda_i^{\frac{1}{2}}}\right]\left[\frac{\exp(-\varepsilon^2(\Delta f/2\rho))}{(2\pi\rho)^{(N-M)/2}}\right], \quad (9)$$

$$= p_F(\Delta f|\Omega)\hat{p}_F(\Delta f|\Omega)$$

wherein $p_F(\Delta f|\Omega)$ is the true marginal density in the principal subspace containing the first M principal components, $\hat{p}_{\bar{F}}(\Delta f|\Omega)$ is the estimated marginal density in the orthogonal complement $\bar{F}$ containing the residual of the expansion. $y_i$ are the principal components and $\epsilon^2(\Delta f)$ is the residual. The optimal value for the weighing parameter $\rho$ is the average of the $\bar{F}$ eigen-values:

$$\rho = \frac{1}{N-M} \sum_{i=M+1}^{N} \lambda_i. \quad (10)$$

For most features, Gaussian assumption is too restricting. Although Gaussian mixture model can be adopted, the cluster number is a magic one which is generally difficult to estimate. Instead, we prefer casting the SVM classifier output $f(\Delta f)$ to the posterior probability. Instead of estimating the class-conditional densities $p(\Delta f|\Omega)$, a parametric model is adopted to fit the posterior $p(\Omega_I|f(\Delta f))$ directly:

$$p(\Omega_I | f(\Delta f)) = \frac{1}{1 + \exp(A\Delta f + B)}. \quad (11)$$

To apply this posterior probability in the similarity function (5), similar derivations can be utilized as in (6).

Candidate Name List Generation

In addition to the use of user feedback and explicit annotation of faces in digital images, the candidate name inference module 210 automatically (i.e., online) generates a candidate name list 218 (a number of labeled faces) with respect to the features 214 that were extracted from faces and their surrounding regions. The candidate name list 218 is sorted according to the similarity measures 216 between unlabeled and labeled faces. Given a number of labeled faces, the candidate name inference's learning algorithms utilize the candidate name list 218 to try to identify an unlabeled face. If several individuals' faces are annotated, it can be regarded as a multi-class classification task to derive the candidate name list 218. Since this learning process is online, the use of fast algorithms, such as nearest neighbor (NN) and K nearest neighbor (KNN), provide for substantially fast name inference computational speeds.

To generate the candidate name list 218, priors of both inter-personal variations $\Omega_I$ and inter-personal variations $\Omega_E$ are integrated into the similarity function, which is equation (5). In this implementation, we assume that an individual will appear more frequently if he or she appeared frequently before. So face counting for each annotated individual is used as the estimation of the prior of this individual's appearing frequency. With more and more faces being annotated, the estimation will become more and more accurate. Based on the nearest neighbor or K-nearest neighbor algorithms, given an unknown face, among its K nearest labeled faces, the name inference module 210 generates the name candidates 218 by sorting the names according to the sum of similarities 218 to the unknown face.

Because the similarity function (5) is actually a posterior probability, it can be regarded as a confidence score of when to annotate an unlabeled face with a top first name among the recommended name candidates in the candidate name list 218. By setting an appropriate confidence threshold in accordance with high annotation accuracy, faces may be annotated automatically once similar faces were annotated before. For example, the candidate name inference module 210 automatically propagates an annotation result 220 to one or more unlabeled faces, as shown in the exemplary name propagation shown in FIG. 8, wherein a face has been annotated with a name propagation result of "Jenny". In this implementation, a user can accept the annotation result by clicking a checkbox button 802 associated with the propagated name, or select another name from a popup menu (e.g., see the popup menu of FIG. 9). Accordingly, if an individual appears in several photos which were taken in the same event and one of the faces was annotated before, the other faces in the set of photos can be annotated by propagation at substantially higher levels of accuracy.

Batch Retrieval/Annotation

Given the face similarity measurement function, one implementation of the face annotation module 204 of FIG. 2 includes a face/name search module 212. This module 212 allows a user to specify/select a name or a face for retrieval and/or annotation of all similar face(s). To this end, if a name is specified, the module 212 will first expand the query to all the faces labeled as that name, and then search other similar faces based on multi-instance search algorithm. That is, all faces in the album are ranked according to the maximum similarity to each query face.

An Exemplary Procedure

Figure 10:
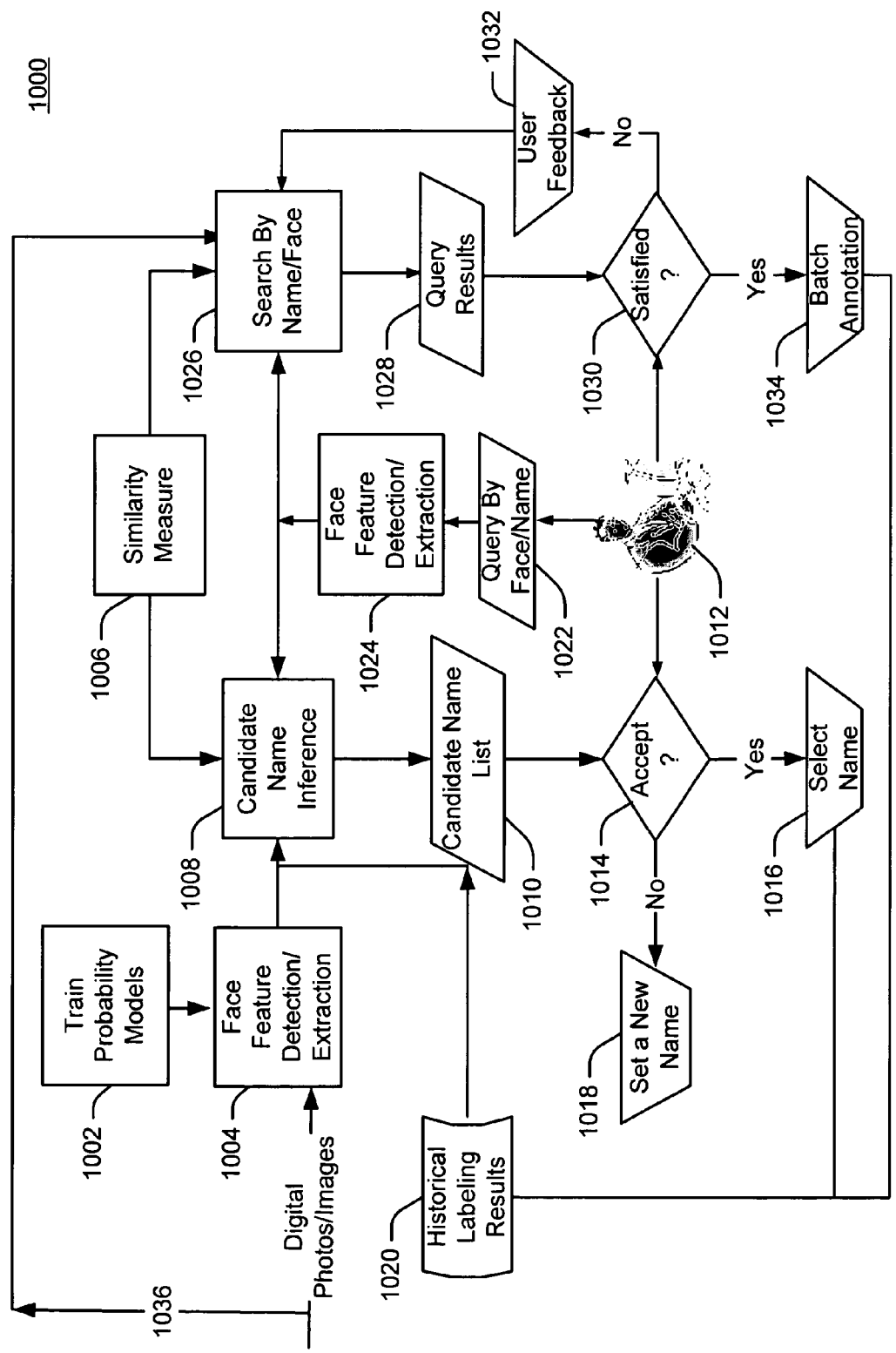
FIG. 10 shows an exemplary procedure to annotate faces in digital image data for photo management.

FIG. 10 shows an exemplary procedure 1000 to annotate faces in digital image data for photo management. The operations 1002 through 1034 are implemented and described with respect to program modules of FIG. 2. At block 1002, a set of training data are collected offline to train the probability model(s) for each facial feature using Support Vector Machine (SVM) or eigenspace approaches. This operation can be performed by the face annotation module 204 of FIG. 2 or by another computer-program application such as by a feature training module 202 of FIG. 2.

At block 1004, face detection/extraction module 206 (FIG. 2) detects and extracts facial feature and context information from one or more input digital images, such as those stored in a digital photo album. A large set of source image data (e.g., family photographs) that contain at least one face is utilized as input data for face annotation. Color, texture, and face appearance features are combined to improve the face annotation. In this implementation, the contextual feature is a fifty (50) dimensional banded auto-correlogram and a fourteen (14) dimensional color texture moment [4]. A 50 dimension color quantization scheme is used. Each detected face region is extended and divided into two (2) blocks to include face and body, respectively. Then two (2) sixty-four (64) dimensional color and texture features are extracted from these two blocks (i.e., the facial features and contextual information are extracted from each detected face area). Accordingly, the contextual feature is a one-hundred-twenty-eight (128) dimensional vector. For purposes of discussion, this extracted feature is referred to as a "body feature".

Face appearance features are extracted from the cropped face images. Based on the eye detection and shape alignment result [2], each face is transformed into a standard form. To estimate the distributions of intra-personal and inter-personal variations, the operations of block 1004 extract pairs of intra-personal face images and pairs of inter-personal face images from the training data. These difference images are combined together to calculate eigenfaces. The difference images are then projected to the eigenfaces trained from these difference images. In n-dimensional eigenspace, wherein n=the number of reserved eigenfaces, SVM is applied again to derive the posterior probability $p(\Omega_f|f(\Delta f))$ of the respective face appearance features.

Figure 9:
FIG. 9 shows an exemplary user interface (a pop-up menu) to present face annotation propagation results, obtain user selection, and/or to allow a user to add a name to a candidate name list.

At block 1006, the similarity measure module 208 (FIG. 2) derives a similarity measure 216 (FIG. 2) for the extracted features of block 1004. To this end, the probability models derived from the training operations of block 1002 are integrated into a Bayesian framework to measure the similarity between each detected face. At block 1008, the candidate name inference module 210 (FIG. 2) generates a list 1010 of name candidates for a given query or new face by statistical learning approaches. (The list 1010 is analogous to the list 218 of FIG. 2). The name list 1010 is determined as a function of the statistically derived similarity measure 216. As shown in FIG. 9, this implementation allows a user 1012 to either select a name (operation 1016) from the presented name list 1010 or add a new name (operation 1018) to the list 1010. The results from operations 1016 are added to a database of historical name results 1020, which is then utilized by the name inference module 210 of FIG. 2 to provide additional accuracy to subsequent name inference operations.

The exemplary procedure 1000 also allows the user 1012 to search for similar faces by specifying either a face or a name in a query 1022. Such a query (e.g., specification of a name or selection of a face) 1022 can be generated via any one or more input devices coupled to user input interface 150 of FIG. 1. At block 1024, the procedure detects and extracts face features from the queried data set as described above with respect to the face feature detection/extraction module 206 of FIG. 2. The search module 212 of FIG. 2 searches the extracted features (see, extracted data 214 of FIG. 2) for images with the queried name/face via the above described techniques. Query results 1026 (see, also annotation query results 220 of FIG. 2) are generated and presented to the user 1012 for relevance feedback. If the user is not satisfied with the results (block 1030), then the user feedback 1032 is fed back into the search module at block 1026 for another search in view of the feedback. Otherwise, the query results are delivered to the historical labeling results 1020 to provide additional accuracy to subsequent name inference operations.

In one implementation, the exemplary operations of procedure 1000 are implemented via a scripting language. This is represented in FIG. 10 via the directional path 1036 from the input image data to the search operation 1026. In this alternative implementation, query results may be evaluated through one or more conditions specified in the script (e.g., a portion of "other data 222 of FIG. 2).

Conclusion

The described systems and methods to annotate faces for photo management Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

REFERENCES

Each of the following references [1] through [12] is hereby incorporated by reference.

[1] Li S. Z., Zhu L., Zhang Z., Blake A., Zhang H., Shum H., "Statistical Learning of Multi-View Face Detection", In Proceedings of The 7th European Conference on Computer Vision, May, 2002, Copenhagen, Denmark

[2] Yan S. C., Liu C., Li S. Z., et al., "Texture-Constrained Active Shape Models", In Proceedings of The First International Workshop on Generative-Model-Based Vision. Copenhagen, Denmark. May, 2002.

[3] Chen L., Hu B., Zhang L., Li M. and H. J. Zhang, "Face annotation for family photo album management", International Journal of Image and Graphics, p.1-14, Vol. 3, No. 1, 2003.

[4] Yu H., Li M., Zhang H. and Feng J., "Color texture moment for content-based image retrieval", Proc. IEEE Intl Conf. on Image Processing, September,

[5] Viola P. and Jones M. J., "Robust Real-time Object Detection", Technical Report, COMPAQ Cambridge Research Laboratory, Cambridge, Mass., Februray,2001.

[6] Moghaddam, B., Jebara, T. and Pentland, A., "Bayesian Face Recognition", Pattern Recognition, Vol 33, Issue 11, p.1771-1782, November 2000.

[7] Rui Y., Huang T. S. and Chang S., "Image Retrieval: Current Techniques, Promising Directions and Open Issues", Journal of Visual Communication an Image Representation, p. 39, vol.10,March, 1999.

[8] Li S. Z., Zhu L., Zhang Z., Blake A., Zhang H., Shum H., "Statistical Learning of Multi-View Face Detection", In Proceedings of The 7th European Conference on Computer Vision, May, 2002, Copenhagen, Denmark.

[9] Satoh S., Nakamura Y., and Kanade T., "Name-it: Naming and detecting faces in news videos". IEEE Multimedia, 6(1), p.22-35, January-March 1999.

[10] Sun Y. F., Zhang H. J., Zhang L. and Li M. J., "MyPhotos—A System for Home Photo Management and Processing", in Proc. ACM Multimedia 2002, December, 2002.

[11] Zhao W., Chellappa R., Rosenfeld A. and Phillips P., "Face recognition: A literature survey", Technical Report, Maryland University, CfAR CAR-TR-948, 2000.

[12] Zhou X. S, Huang T. S., "Relevance feedback for image retrieval: a comprehensive review," ACM Multimedia Systems Journal, special issue on CBIR, 2002.

The invention claimed is:

1. A method implemented by a computing device, the method comprising:

deriving a similarity measure by integrating results from content-based image retrieval and face recognition into a Bayesian framework to obtain a maximum posterior estimation that extended face area contextual features, face appearance, and face components associated with a set of facial features match a particular set of features identified in a probability model, the probability model mapping one or more sets of sample facial features independent of any specific individual to corresponding names of individuals; and inferring a name of a particular person that corresponds to the facial features as a function of the similarity measure.

2. The method as of claim 1, wherein modeling the similarity measure further comprises marginalizing the similarity measure over one or more missing features to arrive at a similarity measure for the one or more missing features.

3. The method of claim 1, wherein deriving the similarity measure further comprises comparing extended face area contextual features from a first digital image with contextual features extracted from a second digital images only if the first and second digital images were generated within a configurable number of days from one another, the second digital image being from a training data set.

4. The method of claim 1, wherein inferring the name further comprises generating a candidate name list by integrating priors of both intra-personal variations $\Omega_I$ and inter-personal variations $\Omega_E$ into the similarity measure.

5. The method of claim 1:
wherein inferring the name further comprises searching historical labeling results to generate a candidate name list; and
wherein the method further comprises automatically annotating the face with the name if the similarity measure meets or exceeds a confidence threshold.

6. The method of claim 1, wherein the face is an unknown face, and wherein inferring the name further comprises:
integrating priors of both intra-personal variations $\Omega_I$ and inter-personal variations $\Omega_E$ into the similarity measure to generate a candidate name list, the candidate name list comprising the name;
based on a nearest neighbor or K-nearest neighbor algorithm, among K nearest labeled faces to the unknown face, sorting names in the candidate name list according to a sum of similarities measures corresponding to the unknown face; and
presenting the candidate list to a user for annotation.

7. The method of claim 1, wherein inferring the name further comprises:
obtaining labeling result from a user;
storing the labeling result into a historical record;
performing multi-class classifications to identify a candidate name list as a function of the historical record; and
wherein annotating the face further comprises presenting the candidate name list to a user, the name being in the candidate name list.

8. A computer-readable medium comprising computer-program instructions executable by a processor for performing the method of claim 1.

9. A computer-readable medium comprising computer-program instructions executable by a processor, the computer-program instructions comprising instructions for:
training a probability model to map one or more sets of sample facial features to corresponding names of individuals;
detecting a face in a digital image;
extracting facial features from the face;
modeling a similarity measure as a posterior probability that the facial features match a particular set of features identified in a probability model, the similarity measure being statistically learned;
inferring a name as a function of the similarity measure; and
annotating the face with the name.

10. The computer-readable medium of claim 9, wherein the digital image is from a family photo album.

11. The computer-readable medium of claim 9, wherein the facial features comprise face appearance, face component, and extended face area contextual features.

12. The computer-readable medium of claim 9, wherein the facial features comprise face appearance, face component, and extended face area contextual features, the face appearance and components being modeled in eigenspaces.

13. The computer-readable medium of claim 9, wherein the instructions for modeling the similarity measure further comprise computer-program instructions for integrating results from content-based image retrieval and face recognition algorithms into a Bayesian framework.

14. The computer-readable medium of claim 9, wherein the instructions for modeling the similarity measure further comprise computer-program instructions for marginalizing the similarity measure over one or more missing features to arrive at a similarity measure for the one or more missing features.

15. The computer-readable medium of claim 9, wherein the facial features comprise contextual features, and wherein the instructions for modeling the similarity measure further comprise computer-program instructions for comparing contextual features of the face with contextual features from other digital images only if the other digital images were generated within a configurable number of days from when the digital image was created.

16. The computer-readable medium of claim 9, wherein the instructions for inferring the name further comprise computer-program instructions for searching historical labeling results to generate a candidate name list.

17. The computer-readable medium of claim 9, wherein the instructions for inferring the name further comprise computer-program instructions for generating a candidate name list by integrating priors of both intra-personal variations $\Omega_I$ and inter-personal variations $\Omega_E$ into the similarity measure.

18. The computer-readable medium of claim 9, wherein the face is an unknown face, and wherein the instructions for inferring the name further comprise computer-program instructions for:
integrating priors of both intra-personal variations $\Omega_I$ and inter-personal variations $\Omega_E$ into the similarity measure to generate a candidate name list, the candidate name list comprising the name;
based on a nearest neighbor or K-nearest neighbor algorithm, among K nearest labeled faces to the unknown face, sorting names in the candidate name list according to a sum of similarities measures corresponding to the unknown face; and
presenting the candidate list to a user for annotation.

19. The computer-readable medium of claim 9, wherein the instructions for inferring the name further comprise computer-program instructions for:
obtaining labeling result from a user;
storing the labeling result into a historical record;
performing multi-class classifications to identify a candidate name list as a function of the historical record; and
wherein annotating the face further comprises presenting the candidate name list to a user, the name being in the candidate name list.

20. The computer-readable medium of claim 9, further comprising computer-program instructions for presenting the name in a user interface (UI), the UI allowing a user to accept or reject the name.

21. A computing device comprising a processor and a memory, the memory comprising computer-program instructions executable by the processor, the computer-program instructions comprising instructions for:
extracting facial features from a detected face in digital image data;
deriving a similarity measure by integrating results from content-based image retrieval and face recognition into a Bayesian framework to obtain a maximum posterior estimation that extended face area contextual features, face appearance, and face components associated with the facial features match a particular set of features identified in a probability model, the probability model mapping one or more sets of sample facial features independent of any specific individual to corresponding names of individuals; and
inferring a name as a function of the similarity measure.

22. The computing device of claim 21, wherein the instructions for modeling the similarity measure further comprise computer-program instructions for marginalizing the similarity measure over one or more missing features to arrive at a similarity measure for the one or more missing features.

23. The computing device of claim 21, wherein the digital image is a first digital image, and wherein the instructions for deriving the similarity measure further comprise computer-program instructions for comparing the extended face area contextual features with contextual features extracted from a second digital images only if the first and second digital images were generated within a configurable number of days from one another, the second digital image being from a training data set.

24. The computing device of claim 21, wherein the instructions for inferring the name further comprise computer-program instructions for generating a candidate name list by integrating priors of both intra-personal variations $\Omega_I$ and inter-personal variations $\Omega_E$ into the similarity measure.

25. The computing device of claim 21:
wherein the instructions for inferring the name further comprise computer-program instructions for searching historical labeling results to generate a candidate name list; and
wherein the computer program instructions further comprise automatically annotating the face with the name if the similarity measure meets or exceeds a confidence threshold.

26. The computing device of claim 21, wherein the face is an unknown face, and wherein the instructions for inferring the name further comprise computer-program instructions for:
integrating priors of both intra-personal variations $\Omega_I$ and inter-personal variations $\Omega_E$ into the similarity measure to generate a candidate name list, the candidate name list comprising the name;
based on a nearest neighbor or K-nearest neighbor algorithm, among K nearest labeled faces to the unknown face, sorting names in the candidate name list according to a sum of similarities measures corresponding to the unknown face; and
presenting the candidate list to a user for annotation.

27. The computing device of claim 21, wherein the instructions for inferring the name further comprise computer-program instructions for:
obtaining labeling result from a user;
storing the labeling result into a historical record;
performing multi-class classifications to identify a candidate name list as a function of the historical record; and
wherein annotating the face further comprises presenting the candidate name list to a user, the name being in the candidate name list.

28. The computing device of claim 21, wherein the computer-program instructions further comprise instructions for annotating the face with the name.

29. A computing device comprising:
means for deriving a similarity measure by integrating results from content-based image retrieval and face recognition into a Bayesian framework to obtain a maximum posterior estimation that extended face area contextual features, face appearance, and face components associated with a set of facial features match a particular set of features identified in a probability model, the probability model mapping one or more sets of sample facial features independent of any specific individual to corresponding names of individuals; and
means for inferring a name of a particular person that corresponds to the facial features as a function of the similarity measure.

30. The computing device of claim 29, wherein the facial features are associated with a face extracted from a digital photograph.

31. The computing device of claim 29, wherein the means for modeling the similarity measure further comprise means for marginalizing the similarity measure over one or more missing features to arrive at a similarity measure for the one or more missing features.

32. The computing device of claim 29:
wherein the digital image is a first digital image; and
wherein the means for deriving the similarity measure further comprise means for comparing the extended face area contextual features with contextual features extracted from a second digital images only if the first and second digital images were generated within a configurable number of days from one another, the second digital image being from a training data set.

33. The computing device of claim 29, wherein the means for inferring the name further comprise means for generating a candidate name list by integrating priors of both intra-personal variations $\Omega_I$ and inter-personal variations $\Omega_E$ into the similarity measure.

34. The computing device of claim 29:
wherein the means for inferring the name further comprise means for searching historical labeling results to generate a candidate name list; and
wherein the computing device further comprise means for automatically annotating the face with the name if the similarity measure meets or exceeds a confidence threshold.

35. The computing device of claim 29, wherein the face is an unknown face, and wherein the means for inferring the name further comprise:
means for integrating priors of both intra-personal variations $\Omega_I$ and inter-personal variations $\Omega_E$ into the similarity measure to generate a candidate name list, the candidate name list comprising the name;
means for based on a nearest neighbor or K-nearest neighbor algorithm, among K nearest labeled faces to the unknown face, sorting names in the candidate name list according to a sum of similarities measures corresponding to the unknown face; and
means for presenting the candidate list to a user for annotation.

36. The computing device of claim 29, wherein the means for inferring the name further comprises:
means for obtaining labeling result from a user;
means for storing the labeling result into a historical record;
means for performing multi-class classifications to identify a candidate name list as a function of the historical record; and
means for wherein annotating the face further comprises presenting the candidate name list to a user, the name being in the candidate name list.

* * * * *